United States Patent Office 2,846,469
Patented Aug. 5, 1958

2,846,469
METHOD OF PREPARING SYNTHETIC dl-3 MONO-AMIDE OF 1-AMINOGLUTARIC ACID (dl-GLUTAMINE)

Maurice Claude Ernest Carron, Alexandra Francine Jullien, and Geneviève Georgette Marie-Madeleine Preud'homme, Paris, France, assignors to Société Anonyme des Laboratories Robert & Carriere, Paris, France No Drawing. Application February 1, 1956
Serial No. 562,673

Claims priority, application France February 23, 1955

2 Claims. (Cl. 260—534)

The synthesis of dl-3 monoamide of the 1-aminoglutaric acid (dl-glutamine) is already known and has been obtained in various manners.

Thus, King and Kidd (J. Chem. Soc.—1949, 3315) employ the following chemical reactions:

REACTION I 1-glutamic acid is condensed with phthalic anhydride in the presence of pyridine. The product resulting from the union of the dl-phthalylglutamic acid with pyridine is transformed into dl-phthalylglutamic anhydride by acetic anhydride

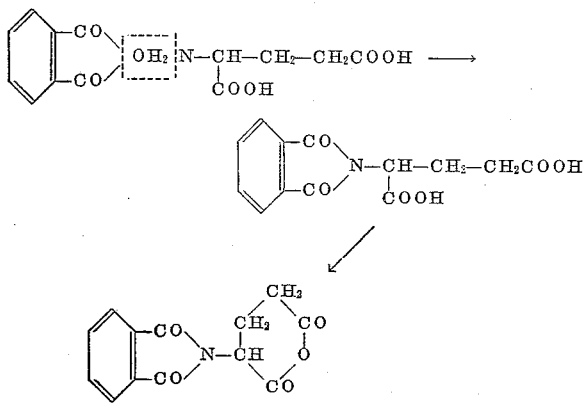

REACTION II dl-Phthalylglutamic anhydride is transformed into diphthalylglutamine by ammonia in an ethereal medium

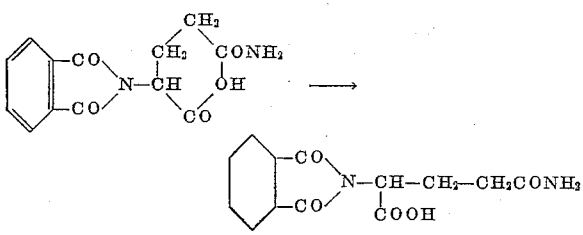

REACTION III

Sodium carbonate is added to the phthalylglutamine in aqueous solution so as to obtain a solution of its sodium salt. Then hydrazine hydrate is added which cleaves the molecule to the level of the nitrogen fixed to the phthalyl group by yielding sodic glutamine and phthalyl hydrazide which is subsequently precipitated by using hydrochloric acid. After separating the phthalyl hydrazide there remains in the solution: glutamine, sodium chloride and an excess of hydrochloric acid which may be fixed partly on the glutamine.

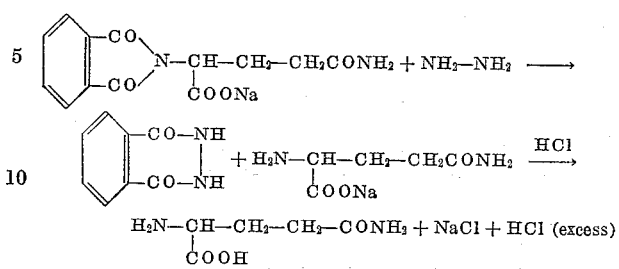

To separate the excess NaCl and HCl, King and Kidd employ silver carbonate which provides a double decomposition with the NaCl, yielding sodium carbonate and silver chloride. The excess hydrochloric acid gives $CO_2$ and silver chloride.

After filtration the solution still contains glutamine and sodium carbonate. To separate the latter, King and Kidd transform it into sodium iodide by exact neutralization with hydriodic acid; they subsequently concentrate the solution and precipitate the glutamine by using alcohol. The sodium iodide remains in solution in this solvent.

According to the present invention the general principle of reactions I, II, III hereabove, as described by King and Kidd, remains unchanged; however, different improvements are brought to the process whereby the synthesis operations are simplified considerably, so that a lower cost and a purer product are obtained.

These improvements are summarized in the closing paragraphs of the following description of three types of reactions carried out in accordance with the teachings of this invention.

Reaction 1

Instead of condensing 1-glutamic acid with phthalic anhydride in the presence of pyridine, and subsequently treating the condensation product with acetic anhydride to yield dl-phthalylglutamic anhydride, the following process is adhered to:

(a) According to Billmann and Harting (J. Am. Chem. Soc., 1948, 70, p. 1473) a mixture of phthalic anhydride and 1-glutamic acid is reacted by using a heated oil bath.

(b) Without separating the resulting 1-phthalylglutamic acid the latter is transformed into anhydride by using acetic anhydride; thus, 1-phthalyl-glutamic anhydride is obtained right away.

EXAMPLE I

An oil bath is used for heating an intimate mixture of 200 parts by weight of glutamic acid and 210 parts by weight of phthalic anhydride. When the inner temperature of the mixture reaches 150° C. the mass softens and the temperature is subsequently increased to 200° C., and held at this value for two hours.

The mass is allowed to cool until its temperature has dropped to 80° C. and then 500 parts by weight of acetic anhydride are added; then the new mixture is heated up to the boiling point of this reagent. As the mixture cools down the 1-phthalyl-glutamic anhydride will soon separate itself. This anhydride is then dried and washed firstly with benzene and then with ether. The melting point of the resulting product is 202° C. Its rotatory power is $(\alpha)_{20} = -3° 6$. The yield is 70%.

The improvements brought to this reaction 1 by the method of this invention in comparison with the known process of King and Kidd are as follows:

(I) Levorotatory phthalylglutamic anhydride is obtained, whilst King and Kidd provide only the recemic form. The levorotatory form is more advantageous for reaction 2.

(II) This anhydride is obtained directly, i. e. without using pyridine, and this feature is a factor of simplification and economy.

(III) The resulting product is purer and melts at 202° C. instead of 195°–196° C. when the process of King and Kidd is used.

Reaction 2

The method of King and Kidd consists in causing a solution in dry dioxane of dl-phthalylglutamic anhydride to contact for half an hour anhydrous ether saturated with dry ammonia. The ammonia salt of the dl-phthalylglutamine separates out, is subsequently dried, put in a concentrated aqueous solution which is acidified to yield dl-phthalylglutamine.

Now this invention consists, in the preparation of the dl-phthalylglutamine, in utilizing the levorotatory form of the phthalylglutamic anhydride instead of its recemic form.

On the other hand, it has been found that the anhydrous ethyl ether acting as a solvent of the ammonia could be replaced by isopropyl ether which, due to a better solubility of the ammonia gas, may be used in lower quantities. On an industrial scale the use of isopropyl ether is attended by less risks of fire than ethyl ether.

Finally, it was found that anhydrous acetone could be substituted for dioxane.

The following example will afford a better understanding of the conditions in which the reaction 2 of this invention may be carried out:

Example II

A saturated solution of ammonia in anhydrous isopropylic ether is prepared. On the other hand, 15 parts by weight of l-phthalylglutamic anyhydride are dissolved in 120 parts by weight of anhydrous acetone.

This second solution is added to 400 parts by weight of the first solution and the mixture is allowed to rest for 30 minutes. An ammonia salt precipitate of the dl-phthalylglutamine is thus formed and subsequently separated and dissolved in 140 parts of water. The resulting solution is then acidified until it turns to Congo red by means of hydrochloric acid 5 N and allowed to rest several days until it crystallizes. The yield is 72% and the melting point 204°–206° C.

The improvements brought by this invention in the case of reaction 2 with respect to the known method of King and Kidd are listed herebelow:

(I) dl-Phthalylglutamine is obtained from the levorotatory form of phthalylglutamic anhydride instead of the racemic form thereof;

(II) Isopropyl ether, which is a better solvent of ammonia, is substituted for ethyl ether. As a consequence, the cost of solvent and the risk of fire are reduced.

(III) Anhydrous acetone, cheaper than dioxane, is used as a solvent.

Reaction 3

Although the hydrolysis of dl-phthalylglutamine into dl-glutamine and phthalylhydrazide by the method described by King and Kidd seems relatively simple, the steps involved by its practical application are long, complicated and costly due to the difficulty encountered in separating the pure dl-glutamine from the inorganic salts found therein at the end of the reaction.

In this method the dl-phthalylglutamine placed in an aqueous medium must be firstly converted into a soluble sodium salt. Then the hydrazine hydrate producing the cold hydrolysis is added. As the resulting phthalyhydrazide is soluble in an alkaline medium, it must be acidified for separating it, but sodium chloride develops at the same time to which the hydrochloric acid introduced compulsorily in excess is added. Therefore, Cl and Na ions are found in the solution of dl-glutamine and must be separated therefrom.

King and Kidd eliminate the chlorine by using silver carbonate, and transform the sodium into iodide which will remain soluble during the subsequent precipitation of the glutamine by the alcohol.

Now this invention improves the technical process described hereinabove in that it is based on the solubility of potassium acetate in alcohol.

This invention consists in transforming firstly the dl-phthalylglutamine not into sodium salt but into potassium salt, this transformation taking place within the water mass.

The resulting aqueous solution is then subjected to the hydrolyzing action of hydrazine hydrate, as in the method advocated by King and Kidd, but instead of precipitating the phthalylhydrazide by means of the hydrochloric acid a slight excess of acetic acid is used to this end.

After the separation, there remains in the solution on the one hand some dl-glutamine of which one portion is in the acetate form, and on the other hand potassium acetate. The dl-glutamine acetate is transformed into potassium acetate and dl-glutamine by adding potassium carbonate up to pH=6. After evaporating to dryness in vacuo it will be sufficient to recover the residue by using ethyl alcohol at 95° which frees the dl-glutamine by dissolving only the potassium acetate.

The following Example III will provide a detailed description of the application of this novel process:

Example III 54 parts of weight of dl-phthalylglutamine are dissolved in 250 parts by weight of water containing 17.5 parts by weight of potassium carbonate.

Upon completion of the solution 10 parts of hydrazine hydrate (100%) are added and the mass is allowed to rest for 48 hours at 20° C.

Then the mass is acidified by using 140 parts by weight of 4 N acetic acid and allowed to rest in a cold atmosphere during four days. The precipitated phthalylhydrazide is then separated and the clear solution brought back to pH=6 by using a sufficient quantity of potassium carbonate in powder form.

The solution is evaporated to dryness in vacuo at low temperature and the residue is subsequently recovered by using 150 parts by weight of alcohol at 95° so that the latter will dissolve the potassium acetate, the dl-glutamine remaining insoluble. Thus, 21 parts by weight of nearly pure dl-glutamine are obtained, representing a yield of 70%.

This method is furthermore advantageous in that it avoids the costly use of silver salts and iodides, and simplifies the operational steps while yielding a product having a higher degree of purity than that obtained through the King and Kidd process.

What we claim is:

1. In the process of producing dl-glutamine by preparing dl-phthalylglutamic acid, converting said dl-phthalylglutamic acid into dl-phthalylglutamic anhydride, transforming said dl-phthalylglutamic anhydride into dl-phthalylglutamine, and hydrolyzing said dl-phthalylglutamine to liberate dl-glutamine, the improvement in the step of preparing the phthalylglutamic anhydride which comprises forming said anhydride by the addition of acetic anhydride to the reaction mixture resulting from the reaction of glutamic acid with phthalic-anhydride, and the improvement in the hydrolysis step which comprises transforming the dl-phthalylglutamine into the potassium salt, subjecting said salt to the action of hydrazine hydrate, precipitating the phthalylhydrazide thus formed with acetic acid to form dl-glutamine acetate, and recovering dl-glutamine from said dl-glutamine acetate.

2. In the process of producing dl-glutamine by preparing dl-phthalylglutamic acid, converting said dl-phthalylglutamic acid into dl-phthalylglutamic anhydride, transforming said dl-phthalylglutamic anhydride into dl-phthalylglutamine, and hydrolyzing said dl-phthalylglutamine to liberate dl-glutamine, the improvement in the hydrolysis step which comprises transforming said dl-phthalylglutamine into the potassium salt, subjecting said salt to the action of hydrazine hydrate, precipitating the phthalyldrazide thus formed with acetic acid to form dl-glutamine acetate, and recovering dl-glutamine from said dl-glutamine acetate.

References Cited in the file of this patent

Billman et al.: J. Am. Chem. Soc., vol. 70, pages 1473–1474 (1948).

King et al.: J. Chem. Soc., vol. 1949, pages 3315–3319.